G. L. MERRILL & O. F. SOULE.
Preserving Green Corn and other Vegetables.
No. 145,581. Patented Dec. 16, 1873.
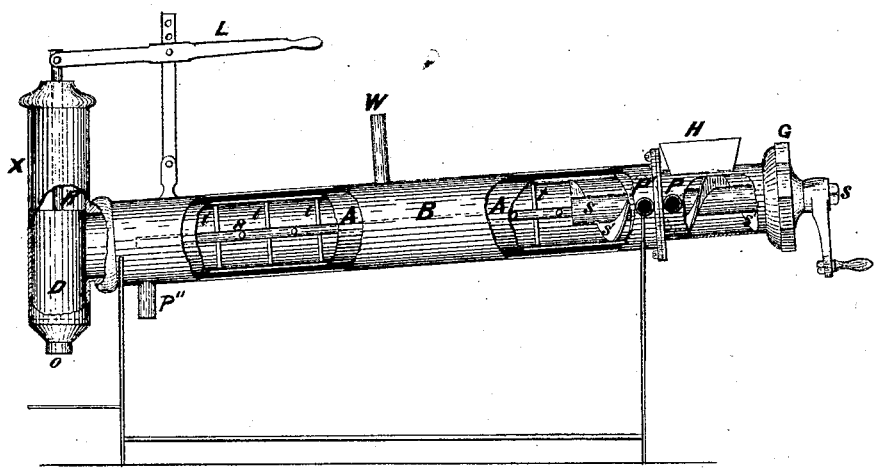

UNITED STATES PATENT OFFICE.

G. LEWIS MERRILL AND OSCAR F. SOULE, OF SYRACUSE, NEW YORK.

IMPROVEMENT IN PRESERVING GREEN CORN AND OTHER VEGETABLES.

Specification forming part of Letters Patent No. 145,581, dated December 16, 1873; application filed September 26, 1873.

*To all whom it may concern:*

Be it known that we, G. LEWIS MERRILL and OSCAR F. SOULE, of the city of Syracuse, in the county of Onondaga and State of New York, have invented a new and Improved Method of Preserving Green Corn and other Vegetables, and the apparatus by which it is done; and we do hereby declare that the following is a full, clear, and exact description of the same, reference being had to the annexed drawings, in which the apparatus is shown partly sectional and partly perspective, and which forms part of this specification.

The method consists in first removing the corn from the cob in any ordinary manner, and subjecting it to the continuous action of steam in a cooking-chamber so arranged that there will be nearly a continuous flow of fresh corn into the chamber and an exit of the cooked corn from it. The steam is applied directly into the cooking-chamber at a point near where the corn is fed, and it is made to permeate all parts of the chamber, the effect of which is to first fix the juices of the corn, so as to retain all its desirable properties, liberate the gases, and then rapidly carry forward the process of cooking. In order to carry the cooking forward more rapidly, we surround or nearly surround the cooking-chamber with a steam-chamber, so that the cooking-chamber may be kept heated in that manner also; and into the cooking-chamber we provide the necessary means for carrying the material through the chamber and stirring it as it passes, so that all parts will be alike subjected to the action of the steam, outside as well as inside. The time for cooking will be about one hour, more or less, to be determined by the judgment of the operator; and the apparatus should be so regulated that all the material as it passes may be subjected to the heat about that length of time. It is so arranged that the steam let into the cooking-chamber will, as far as possible, be carried forward with the corn in the chamber; and the cooking-chamber should not allow the steam to escape more than is absolutely necessary. At the place of exit for the cooked corn, an apparatus is provided by which the corn is forced into the mouth of the can in its heated state with the least possible exposure to the air.

The cans are then sealed up in the ordinary manner. This method will fix the juices, and either completely cook the corn or so nearly that a very short cooking in the can will be all that will be necessary for its preservation.

The action of the steam, as above set forth, fixes and changes the juices, so that the mere gases pass off; and when the corn comes to be put into the cans, the further cooking therein, if necessary, can be effected without puncturing the cans. They will swell but little, and when cooked will quickly return to their natural position.

In cooking other vegetables, care must be taken not to injure them by the stirring apparatus; and where they are liable to be injured by it, the stirring apparatus should be removed.

In our apparatus we use a cylindrical cooking-chamber, A, about ten or twelve feet long, more or less, and about five or six inches in diameter, more or less. H is a hopper, of convenient size, in the proper location for feeding the corn into the cooking-chamber. P is the pipe for introducing steam into the cooking-chamber, provided with an ordinary valve for letting on and regulating the steam. Inside the cooking-chamber we provide a shaft, S, to be operated at the feeding end by power, or by the hand of the operator, passing through a head, G, to be fitted upon or into the feeding end of the cooking-chamber, and as tight as may be, so as to prevent the escape of steam or juices from the corn. Upon this shaft S, at the feeding end of the cooking-chamber, we provide an ordinary spiral, S', about two or three feet long, which fits as snugly as may be into the cooking-chamber to allow of easy operation. The remainder of the shaft S is provided with teeth $t\ t\ t$, as many as may be necessary to keep the corn well stirred in that part of the cooking-chamber. The spiral S' should turn at least once with the shaft S before coming to the point where the pipe P lets the steam into the cooking-chamber, so that it will tend to prevent exit of the steam through the hopper H. B is another cylinder, of about an inch more diameter than the cooking-chamber A, made to surround it steam-tight, so that there will be a steam-chamber between the two cylinders of about half an inch space. P' is the pipe for letting the steam into this steam-chamber, also provided with necessary feeding and regulating valves. P″ is the exhaust-pipe, also provided with a valve. Any ordinary steam-gage, W, may be applied to the cylinder B, so as to regulate the pressure of steam, which should be about fifteen pounds to the square inch, more or less. At the point of exit from the cylinder, we provide a transverse cylinder, $x$, with a spout, $o$, to be inserted into the mouth of the can, and with a plunger, R, having a head, D, of sufficient length to cover the end of the cooking-cylinder and keep the corn back until it is necessary to fill a can. The plunger R is operated by an ordinary lever, L.

We claim that corn preserved by the above process will be of better quality than when cooked in any ordinary manner, or when cooked in cans, because when cooked in cans the gases are kept with the juices while the cooking is going on, and the corn and juices are injured thereby; while, by our method and apparatus, the steam let into the cooking-chamber fixes and changes the juices at once, and the gases immediately pass off, leaving the corn of a natural color and flavor.

Another advantage in favor of our process is the rapid manner in which the corn can be put up.

What we claim as our invention, and desire to secure by Letters Patent of the United States, is—

1. The above-described method of cooking and preserving green corn and other vegetables by steam applied directly into the cooking-chamber and outside thereof, substantially in the manner described.

2. The cooking-chamber A, when arranged and operated substantially as described, for the purpose of cooking green corn and other vegetables.

3. The cooking-chamber A, arranged and operated as aforesaid, when combined with the shaft S, provided with a spiral and teeth, or their equivalent, substantially in the manner described.

4. The combination of the cooking-chamber A, cylinder B, and shaft S, with its spiral and teeth, as above described.

5. The combination of the cooking-chamber A, cylinder B, and shaft S, with its spiral and teeth aforesaid, with the canning apparatus $x$ $o$ R, substantially as above set forth.

OSCAR F. SOULE.
G. LEWIS MERRILL.

Witnesses:
N. B. SMITH,
C. W. SMITH.